United States Patent [19]

Larson et al.

[11] 4,128,044

[45] Dec. 5, 1978

[54] METHOD OF CONTROLLING APPARATUS AND SERVOACTUATOR THEREFOR

[75] Inventors: Gerald L. Larson; William A. Treadwell; James Seaver, all of Battle Creek, Mich.

[73] Assignee: Eaton Corporation, Cleveland, Ohio

[21] Appl. No.: 726,728

[22] Filed: Sep. 27, 1976

[51] Int. Cl.² .......................................... F15B 13/044
[52] U.S. Cl. .......................................... 91/20; 91/31; 91/410; 91/448; 91/459; 335/265
[58] Field of Search ............... 91/459, 410, 456, 457, 91/361, 20, 445, 448, 387; 335/259, 265

[56] References Cited

U.S. PATENT DOCUMENTS

| | | | |
|---|---|---|---|
| 728,611 | 5/1903 | Potter | 91/459 |
| 1,259,901 | 3/1918 | Parker | 335/265 |
| 1,908,471 | 5/1933 | Brewer | 91/459 |
| 3,012,578 | 12/1961 | Ludwig | 335/265 |
| 3,364,818 | 1/1968 | Hoger et al. | 91/448 |
| 3,477,346 | 11/1969 | Slovin et al. | 91/457 |
| 3,905,720 | 9/1975 | Greune et al. | 91/417 R |

*Primary Examiner*—Paul E. Maslousky
*Attorney, Agent, or Firm*—Roger A. Johnston

[57] ABSTRACT

A novel electropneumatic servoactuator utilizing a fluid pressure control signal chamber and a duty-cycle control valve alternating between a fluid supply pressure port means and port means venting the chamber to the atmosphere and controlling fluid pressure in the chamber. The control valve is driven by electromagnetic means comprising a coil responsive to an electrical input signal. Pressure responsive actuator means moves in response to the chamber pressure level for providing a mechanical position output. Feedback means senses movement of the actuator means and throttles the fluid flow in one of said port means. In another aspect of the invention, an auxiliary dump release valve armature means is also driven by the coil in preferably magnetic series circuit arrangement with the control valve and coil for rapidly porting the control chamber to the atmosphere for emergency release.

14 Claims, 14 Drawing Figures

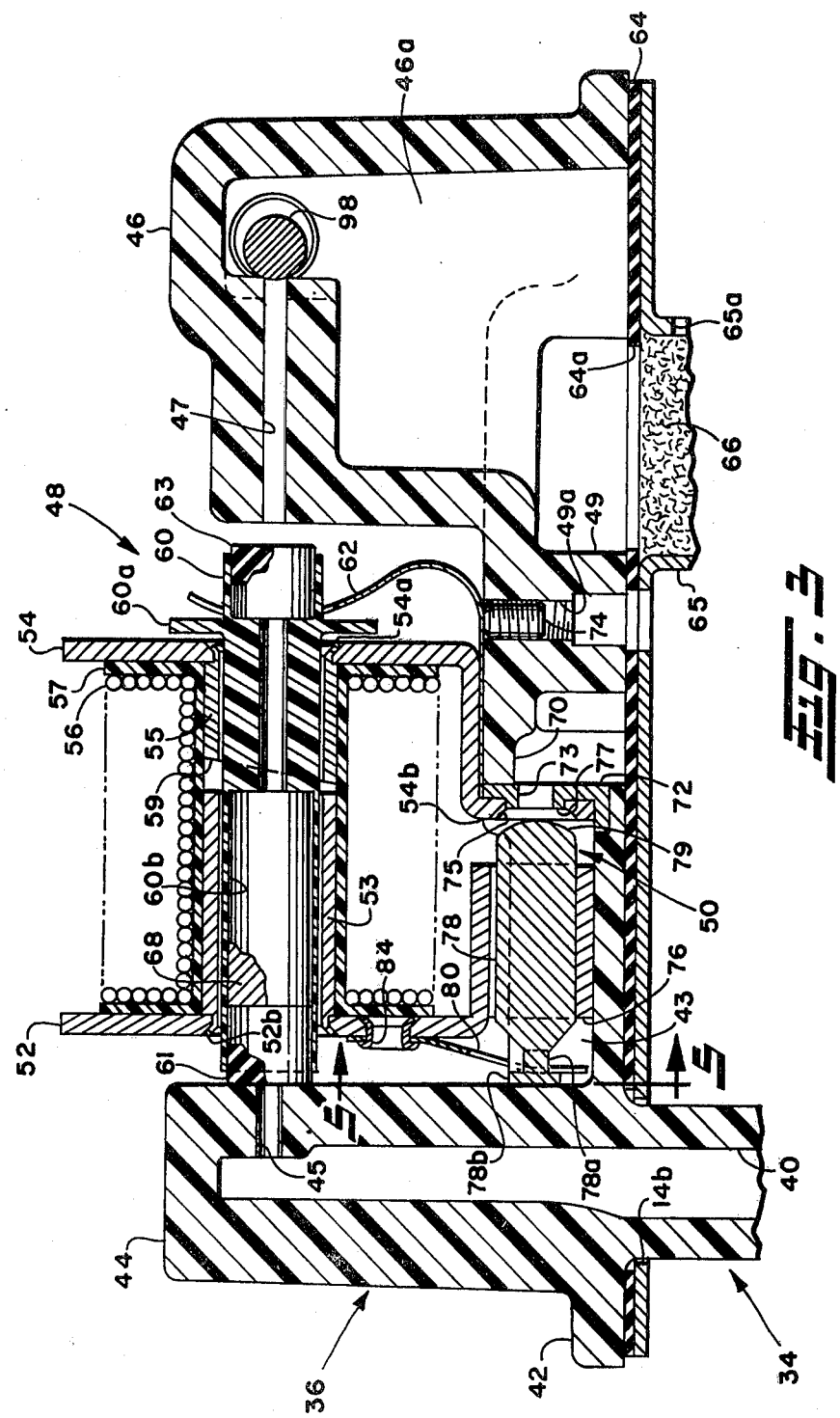

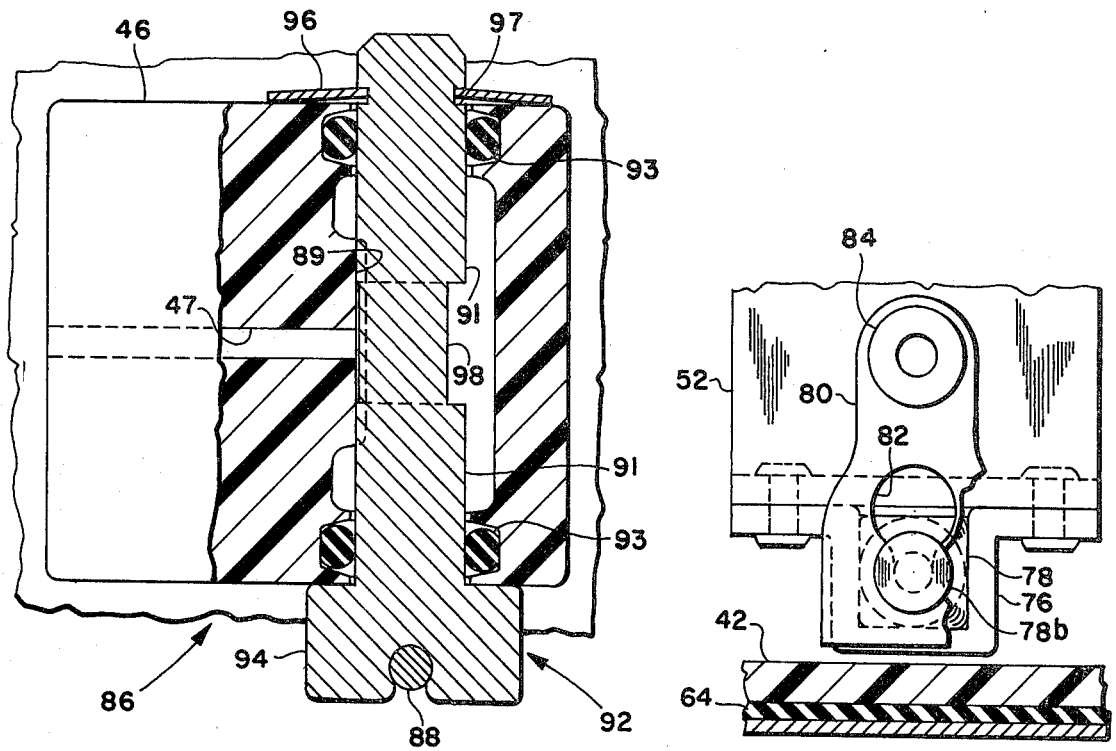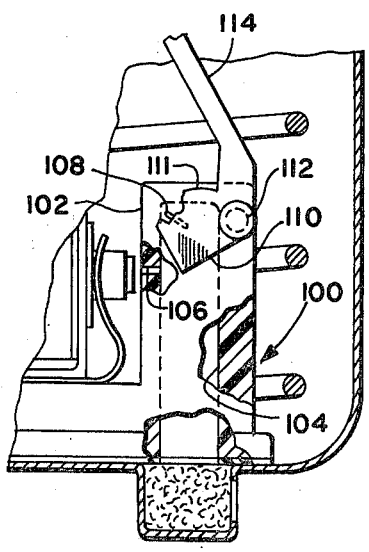

METHOD OF CONTROLLING APPARATUS AND SERVOACTUATOR THEREFOR

BACKGROUND OF THE INVENTION

Electropneumatic servoactuators are used in control systems where it is desired to convert a varying electrical input control signal to a mechanical position output which is controlled by the electrical input signal. This type of servoactuator derives its source of energy for the force output from connections to a source of fluid pressure and, in the case of the electropneumatic servo, the source of fluid pressure may either be compressed air or other gas or vacuum. Servoactuators of this type are used for dynamic control situations as, for example, the operation of the movable control surfaces such as ailerons, elevators and flaps of an aircraft or for throttle control of a powered vehicle. In this latter type of application, it has been found particularly convenient to use an electropneumatic servoactuator connected to a source of subatmospheric pressure, or vacuum, for controlling the throttle of a motor vehicle in the operation of vehicle road speed regulators or cruise controls, as they are commonly called.

In vehicle speed regulator systems of the type known as "closed loop response" to those skilled in the art, it has been determined that a force balance output servoactuator cannot accommodate the spring forces, hysteresis, and friction present in the throttle linkage systems, which vary widely between vehicles. Where attempts have been made to utilize a force output fluid pressure servoactuator, the output has varied with variations in the fluid supply pressure, with altitude and with variations in electrical power to the electrical and electromagnetic components of the servo.

For vehicle speed regulator systems having "closed loop" logic control response, the criteria for satisfactory servoactuator operation are: (a) the ability to position accurately and repeatedly in response to a given input control signal in a manner independent of the throttle and within the capability of the servo.

In motor vehicles powered by naturally aspirated internal combustion engines, a source of subatmospheric pressure or vacuum is readily available from the induction manifold for feeding the combustible charge to the respective combustion chambers. Therefore an electropneumatic throttle servoactuator of the type operating from such a source of subatmospheric pressure has been found particularly suitable for use in controlling throttle of a motor vehicle during operation of a cruise control for the vehicle.

In providing a cruise control system for a vehicle, those skilled in the art of servomechanisms and control systems have recognized that, in order to provide accurate position output, yet eliminate the need for a prohibitively high degree of gain in the control system, it is desirable to provide some means of feedback of the throttle position to the control input in order to provide the closed loop response. Heretofore, the throttle position has been detected electrically and an electrical signal fed back to the input control signal generator for modifying electrical control input signal to the servo. However, it is also known to provide mechanical feedback of the throttle position within the servoactuator to directly control the fluid pressure acting upon the output force actuator. Examples of this latter type of feedback are described in U.S. Pat. No. 3,298,482 to R. S. Mueller et al., and in a copending application assigned to the assignee of the present invention, Ser. No. 671,539, now U.S. Pat. No. 4,072,206, filed Mar. 29, 1976 to Larson et al., and a copending application assigned to the assignee of the present invention, Ser. No. 660,290, now U.S. Pat. No. 4,046,213, filed Feb. 23, 1976 to G. L. Larson. In the Larson references a servoactuator is shown as having a control valve member alternating between a fluid pressure port and a port venting the fluid pressure chamber to the atmosphere, in a manner alternately closing the fluid port for controlling the fluid pressure in the chamber. The control valve is driven by the magnetomotive force (mmf) of an electromagnetic means responsive to the input electrical signal. Such an arrangement is known as a duty cycle control, or "flapper," valve; and, the mmf is typically produced by the input control signal having a series of width modulated pulses applied to the electromagnetic means, usually a coil. The alternating movement of the control valve flapper between the vent and fluid pressure supply port means in accordance with the modulation of the control signal determines the fluid pressure within the servo chamber at any given time. The pressure in the chamber acting on the actuator means produces the desired position output.

In control systems where closed looped control is desirable for providing a position output as, for example, in vehicle speed regulation, it has been found particularly useful to employ the throttle position feedback technique mentioned above. One such technique for employing direct mechanical throttle position feedback is that shown and described in copending application Ser. No. 671,539 described above in which a pivotable member senses motion of the actuator means and by its pivotal motion alters the bias of the spring providing the return force on the control valve flapper, thereby altering the duty cycle movement of the flapper in response to the control signal. This type of throttle position feedback directly within the servoactuator, by varying the force on the control valve flapper, affects the response of the flapper to the mmf and alters the movement of the flapper and affects the dynamic characteristic of the control valve flapper by changing the air gap relationship of the flapper to the ferromagnetic core employed with the coil. This change in air gap caused by the feedback complicates the design of the control valve flapper and undesirably limits the response characteristics of the flapper to the control signal.

In the design and manufacture of such duty cycle type pneumatic servoactuators it has also been found desirable to provide an auxiliary means of relieving fluid pressure from the servoactuator chamber in emergency situations. For example, where the servoactuator is used for vehicle speed control system and connected to the vehicle throttle, it is necessary that the actuator means release the force on the throttle almost instantaneously upon activation of the vehicle service brakes. In order to accomplish such rapid release, it has been found necessary to provide an auxiliary vent or dump valve in the servo chamber. Previous means of providing auxiliary venting or dumping of the servo chamber have been that of a separate electromagnetically actuated valve member covering an auxiliary vent or dump port. Such an electromagnetic dump valve may then be actuated by a switch attached to the vehicle brake pedal as is known in the art.

However, in providing an auxiliary dump valve for the servoactuator for fluid pressure chamber, it has been found necessary in previous systems to employ a separate electromagnetic coil for actuating the dump valve. The addition of a second electromagnetic coil circuit to the servoactuator has proven to be costly and also requires additional power to the servoactuator.

SUMMARY OF THE INVENTION

The present invention provides a solution to the above-described problem of providing an electropneumatic position-output servo for closed loop control response. The novel servoactuator described and claimed herein provides modification of the control pressure in the fluid pressure chamber of an electropneumatic position output servoactuator by providing direct feedback from the output actuator means to the fluid pressure signal control valve. The present invention provides such direct output position feedback to the pressure control chamber without altering the response of the duty cycle of the electromagnetically actuated control valve to the input control signal.

In another aspect, the present invention incorporates an emergency dump, or vent, valve to the fluid pressure control chamber of the servoactuator. The dump or auxiliary vent valve of the present servoactuator is disposed adjacent the electromagnetic driver coil for the duty cycle control valve and the dump valve is in magnetic series circuit arrangement with the coil and the control valve. Thus, a current through the driver coil produces a magnetomotive force acting upon both the control valve flapper and the dump valve. By arranging the flapper valve bias force and the bias force of the dump valve at substantially different levels, the dump valve and duty cycle control valve are each responsive only to certain predetermined levels of the control signal; and, thus the operation of the duty cycle valve during normal control does not effect the dump valve. The present invention provides that, upon onset of control signal to duty cycle valve, the dump valve will be pulled into the closed position, and during normal oscillation of the input control signal, the dump valve will be held in closed position even when the control signal reaches its lowest operating level.

BRIEF DESCRIPTION OF THE DRAWINGS

FIG. 3 is a section view taken along section indicating lines 3—3 of FIG. 1;

FIG. 4 is a section view along section indicating lines 4—4 of FIG. 2;

FIG. 5 is a section view taken along section indicating lines 5—5 of FIG. 3;

FIG. 6 is a view similar to FIG. 2 and shows another version of the feedback means using an auxiliary bleed port in the control block;

STRUCTURE AND OPERATION

Figure 1:
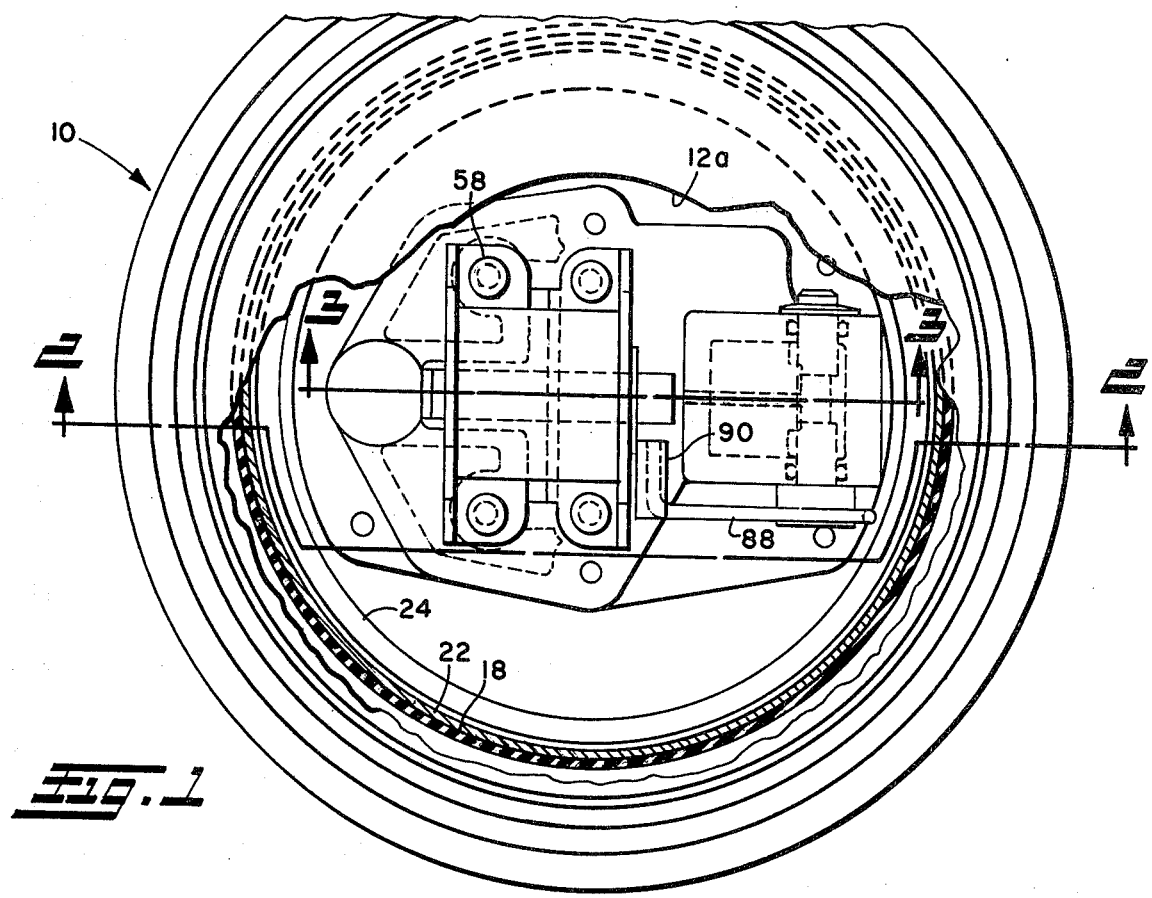
FIG. 1 is a plan view of the servoactuator with the cover housing partially broken away.
Figure 2:
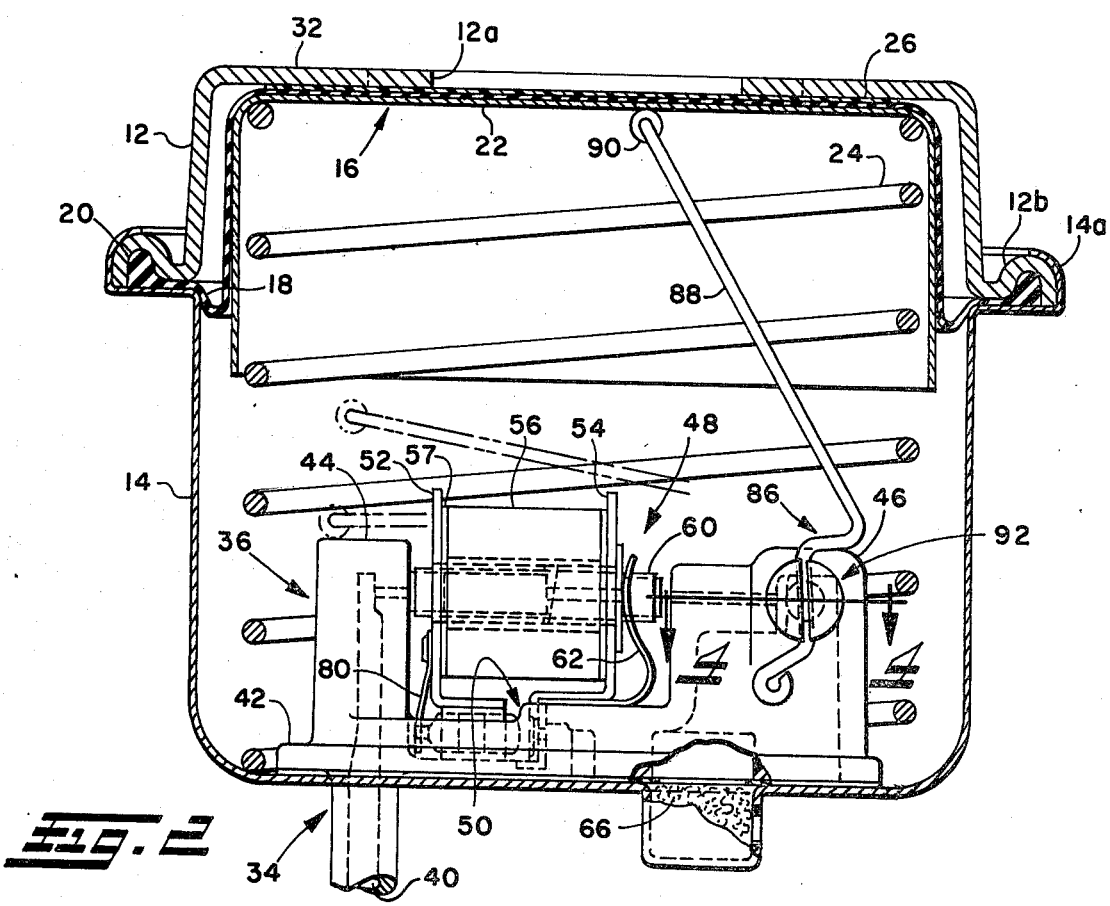
FIG. 2 is a section view taken along section indicating lines 2—2 of FIG. 1.

With reference to FIGS. 1 and 2, the servoactuator 10 is shown as having a cover housing comprising an upper shell 12 and a lower shell portion 14 with the shell portions being joined at their mating periphery to form an enclosure housing for the servoactuator. The upper shell has an aperture 12a formed centrally in the top surface thereof for permitting access to the pressure responsive actuator 16 which comprises a flexible resilient diaphragm 18 preferably formed of elastomeric material and having the outer periphery thereof configured to provide a bead 20 for sealing between the outer periphery of the mating housing shells 12 and 14. In the presently preferred practice of the invention the housing shells are sealed over the diaphragm bead 20 by, for example, crimping or spinning a lip portion 14a on a lower shelf over a corresponding lip portion 12b on the upper shell. The actuator 16 further has an inner cup 22 providing backing for the central portion of the diaphragm 18 and also providing a seating surface and retainer for the actuator return spring 24. An outer reinforcing plate 26 is provided for protecting the diaphragm from chafing against the inside surface of the upper shell 12. Attachment means (not shown) is provided in the center of the actuator 16, preferably by riveting through an aperture extending through the diaphragm 18, inner cup 22 and outer backing plate 26. The attachment means may be provided with any suitable fastening expedient as, for example, threaded connection or an aperture for receiving an attachment pin, for transmitting the force of the actuator 16 to the article or device upon which the actuator is to perform work.

The space between the lower surface of diaphragm 18 and the inner periphery of the lower shell 14 defines a fluid pressure control chamber 32. A fluid pressure supply port 34 is provided through an aperture 14b provided in the bottom of the lower shell 14 (see FIG. 3). The port 34 is preferably formed integrally with the structural base of the servo comrising control block 36 and comprises a nipple portion 38 which extends from the control block 36 through the aperture 14b. Nipple 38 has a bore 40 provided therethrough for communicating a source of fluid pressure, preferably vacuum, from the nipple to the interior of the control block 36. Although a subatmospheric source is preferred, it will be understood that a superatmospheric, or positive gauge pressure source, may be employed, whichever is more suitable for a particular application. The control block 36 has a base portion 42 from which a vacuum tower 44 extends upwardly therefrom adjacent the left end of the base with reference to FIGS. 1 and 2, and an air tower portion 46 which extends upwardly therefrom is spaced relationship from the vacuum tower and adjacent the right end of the base 42. The vacuum tower 44 has a vacuum orifice provided therein, as will be hereinafter described and shown in detail, which communicates with the vacuum port 40 for creating a subatmospheric pressure in control chamber 32 upon connection of a source of vacuum to the port 40. The air tower 46 has a hollow configuration and the base of the control block has a cut-out portion, described and shown hereinafter in detail, which communicates the interior of the air tower with the atmosphere external to the lower shell 14 through an aperture provided therein. The air tower has a vent orifice, which will be described hereinafter in detail, which communicates the hollow interior of the air tower with the control chamber 32 within the housing shell for providing venting of the chamber 32 to the atmosphere.

The central portion of the control block base 42, in the region intermediate the vacuum tower and the air tower, has the duty cycle control valve assembly 48, including the dump valve assembly 50, attached thereto which control valve serves to control the flow of fluid through the vacuum and vent orifices for controlling the pressure in chamber 32 in response to an electrical control signal. The dump valve assembly 50 serves to rapidly neutralize the fluid pressure in the chamber 32 to atmospheric level to thereby release the actuator 16 to it unactuated position shown in solid line in FIG. 2.

With reference to FIGS. 2 and 3, the control valve assembly 48 includes a pair of left and right hand pole pieces 52 and 54 formed of ferrmagnetic material which serve as a mounting frame for a coil 56 formed of electrically conductive material wound about a support bobbin 57 and disposed between the pole pieces 52 and 54. The coil typically has means, omitted for clarity in the drawings, such as insulated leads provided for attachment to opposite ends of the conductor thereof, which means pass through the lower shell 14 in the form of connector terminals (not illustrated) as will be readily understood by those having skill in the art; and, the connectors are adapted to receive the electrical control signal therethrough. The pole pieces 52 and 54 are attached to the base or the control block 42 by suitable fastening means as, for example, rivets or screws 58, see FIG. 1, and thus provide a mounting support for the coil 56 and the dump valve assembly 50. With reference again to FIGS. 2 and 3, the pole pieces 52 and 54 are each apertured centrally and have received therethrough a shuttle 60 having a flange 60a provided on the end thereof extending from right hand pole piece 54, which flange has in contact therewith a bias spring 62 extending from the control block base 42, which bias spring urges the shuttle in a leftward direction and toward the vacuum tower 44. In operation, as the driver coil 56 receives a sufficient predetermined level of the electrical control signal, the magnetomotive force in the coil overcomes the bias of spring 62 and the shuttle moves rightwardly in FIGS. 2 and 3 toward the air tower 46. Upon decay of the current flow in coil 56 caused by control signal dropping below the predetermined level, the shuttle is moved leftward toward the vacuum tower 44 under the urging of bias spring 62.

Referring particularly to FIG. 3, the control block 36 is mounted to the bottom of the lower shell 14 with a fluid pressure sealing gasket 64 provided therebetween. The air tower 46, as mentioned above, has a hollowed-out portion in the form of air cavity 46a provided therein which communicates with an aperture 14b provided in the bottom of the shell through a corresponding aperture 64a provided in the sealing gasket between the control block and the lower shell. The lower shell 14 has a blister 65 formed thereon which covers the aperture 64a and provides a pocket for the air inlet filtering material 66 which receives air through an air inlet aperture 65a provided in the blister. The filtering material 66 in the blister serves to prevent entry of foreign material into the cavity 46a in the control block.

A vent control air orifice 47 is provided horizontally through the air tower and communicates the control chamber 32 with the cavity 46a in the air tower. The air orifice 47 is preferably aligned with the axial center line of the shuttle 60.

The vacuum tower 44 has a vacuum orifice 45 formed horizontally therein and preferably aligned axially with the shuttle 60. The orifice 45 communicates the control chamber 32 with the vacuum port 40 in the vacuum tower. The shuttle 60 is preferably formed of a plastic material and has a slug 68 of ferromagnetic material for providing the magnetomotive force on the shuttle and is disposed in a counterbore 60b formed in the left end thereof. When electric current flows in the coil 56, a continuous flux path is provided through pole pieces 52 and 54 and the slug 68. The shuttle 60 has a pad 61 of preferably resilient elastomeric material provided on the left end of the shuttle such that movement of the shuttle leftward, under the urging of bias spring 62, causes the pad 61 to contact and seal the vacuum orifice 45 preventing fluid flow therethrough and thus limiting further evacuation of the control chamber 32. A corresponding pad 63 is provided on the right end of the shuttle 60 such that, upon energization of the coil and creation of a sufficient magnetomotive force on slug 68, the shuttle moves rightward until pad 61 contacts the face of orifice 45 to seal thereagainst and prevent flow of air from chamber 46a through the orifice 45 into control chamber 32.

As mentioned above, the ferromagnetic slug 68 resides in the magnetic flux path which flows through pole pieces 52,54 upon energization of coil 56. This is accomplished by providing ferromagnetic guide tubes extending respectively inwardly from each of the pole pieces 52 and 54, such that the shuttle is guided by the guide tubes. The guide tube 55 is attached in aperture 54a is the end of pole piece 54 and is preferably secured therein by flaring, or welding, with the right-hand end of the tube 55 providing a recessed or flush surface with the right-hand vertical face of the pole piece 54. The tube 55 has the left end portion extending inwardly of the coil 56 and has the outer periphery thereof received in closely fitting relationship with the inner periphery of coil bobbin 57. A guide tube 53 is similarly attached in an aperture 52b provided in left-hand pole piece 52, with the right end of the guide tube 53 also received in closely fitting relationship in the inside diameter of the coil bobbin 57. In the presently preferred arrangement of the shuttle, the guide tube 53 extends rightwardly in FIG. 3 beyond the axial midpoint of the coil bobbin and has the right-hand end thereof disposed at right angles to the axis of the shuttle. The right-hand guide tube 55 has the left end thereof 59 terminated adjacent the end of guide tube 53 and inclined so as to provide a tapered air gap 59 between the adjacent ends of the guide tubes within the coil bobbin. The ferromagnetic slug 68 is positioned within the shuttle counterbore 60b such that, when the shuttle pad 63 is in sealing contact with the face of air orifice 47, the right hand end of slug 68, which is formed at right angles to the axis of the shuttle, crosses the inclined end of guide tube 59. This arrangement creates residual magnetomotive force on the slug 68 tending to urge the shuttle in the rightward-most position of its movement, thereby firmly pressing pad 63 against the face of the air orifice 47 in fluid pressure sealing contact.

The hollow cavity 46a in the air tower also extends into the central region of the control block and communicates with the control chamber 32 through an auxiliary passage 70. A well 43 is formed in the base 42 of the control block and a sealing washer 72 is disposed vertically along the wall thereof, the washer having an orifice 73 formed therein and aligned to communicate with passage 70. The air tower cavity 46a also has a boss 49 provided therein with a vertical bore 49a extending from the lower surface of the base of the control block vertically upward therethrough to the base portion of the bias spring 62. An adjustment screw 74 is threadedly received in bore 49a for adjusting the preload on the shuttle return spring 62.

The right hand pole piece 54, as illustrated in FIG. 3, has a generally "Z" shape in cross section, with the lower portion thereof extending vertically downward along the vertical portion of the wall 43 in the control block, so as to receive in contact therewith the face of the sealing washer 72 and retain same against the vertical portion of well 43 in the control block. The lower portion 54b of pole piece 54 has a spherically chamfered aperture 75 formed therein and disposed concentrically with the aperture 73 in the sealing washer, so as to provide a registering surface. In the presently preferred practice the sealing washer 72 has a shoulder providing a raised seat portion 77 thereon surrounding the aperture 73 and extending axially into the spherical seat 75.

The left hand pole piece 52 is generally L-shaped with the shorter leg forming a base portion for attachment to the control block base 42 by suitable fastener as, for example, the screws 58. An auxiliary member 76 is attached to the base leg of the L-shaped pole piece 52 on the underside thereof as shown in FIG. 5. The auxiliary member 76 has a preferably square hat-shaped configuration in transverse section and forms a longitudinal guide in a direction axially coincident with the shuttle movement. A dump valve armature, or core, 78 is slidably received in the member 76 and moves in a direction substantially parallel to the movement of the shuttle 60. A bias spring 80, having an elongated slot 82 formed therein as shown in FIG. 5, is attached by one end thereof to the pole piece 52 by a suitable fastening means, for example, rivet 84; and, the slotted portion 82 of the spring extends downwardly with the left end of armature 78 received through the slot 82. The dump armature 78, as shown in FIG. 3, is preferably formed with a neck portion 78a of reduced diameter formed adjacent the left end thereof and with a flange 78b provided on the left end thereof and sized so as to extend beyond the width of the narrower portion of the spring slot 82. Spring 80 is formed so as to exert a bias force against the underside of flange 78b on the dump armature, thereby biasing the dump armature in a leftward direction in FIG. 3. The right-hand end of dump armature 78 has a spherically chamfered seating surface 79 for contacting the seat 77 of washer 72 in fluid pressure sealing contact.

The arrangement of the dump guide 76 which is formed of ferromagnetic material, is such that the lower leg 54b of the pole piece 54 and the right end-face of the dump guide 76 are disposed in vertical alignment so as to form an air gap therebetween. This arrangement provides that, when the dump armature 78 is disposed in the guide 76, the same lines of magnetic flux which pass through the slug 68 in the shuttle 60 also pass through dump armature 78, dump guide 76 and across the air gap between spherical surface 79 and the lower portion 54b of pole piece 54. With reference to FIG. 3, it can be seen how a series flux path has been established by a ferromagnetic loop defined by left-hand pole piece 52, guide tube 53, shuttle 68, guide tube 55, right-hand pole piece 54, dump armature 78, guide 76, an a return to pole piece 52. A magnetomotive force is thus created on dump armature 78 tending to move the dump armature to the right in FIG. 3 for overcoming the bias force of return spring 80 and tending to cause the spherical surface 79 to seat against the sealing washer 72. In the rightwardmost position, the dump armature 78 thus provides a fluid pressure-tight seal against the washer 72 and prevents air flow from cavity 46a through passage 70, orifice 73 and into the control pressure chamber 32. When the current flow in coil 56 is sufficiently low that the magnetomotive force in dump armature 78 does not overcome bias spring 80, the dump armature is in its leftmost position with the flange 78b resting against the air tower 44, with the dump orifice 70 open and thereby permitting air flow into the control chamber 32, thus preventing creation of any subatmospheric pressure in the control chamber.

It will thus be apparent that the unique magnetic series arrangement of the shuttle and dump armature with the pole pieces permits a single electrical coil to provide controlled operation of the control valve shuttle 60 and also dump valve armature 78.

Referring now to FIGS. 2, 3 and 4, another aspect of the invention is illustrated, wherein the feedback means 86 includes a lever arm 88 pivotally mounted through air tower 46 with the free end thereof as mentioned hereinbefore having a follower 90 mounted thereon which contacts the undersurface of the spring retainer cup 22. The end of the lever arm 88 opposite the follower 90 is attached to the end of a spool 92 which is rotatably received in bore 89. The bore 89 communicates with the air orifice 47 and is disposed at generally right angles thereto. The spool 92 has end portions 91 received in closely fitting relationship with the bore 89 and sealed therearound at each end thereof by seals 93 which prevent leakage of air from the air tower chamber 46a axially outwardly between the spool and bore 89 and into the control chamber 32. The spool is retained in the air tower by a flange 94 provided on one end thereof and the flange has an aperture or recess 95 formed therein with lever 88 received therein. The opposite end of the spool has suitable retaining means such as a retaining washer 96 with the retaining washer bearing against the side of groove 97 formed in the spool. The region of the spool 92 adjacent the midlength thereof has provided thereon a cylindrical portion of lesser diameter than the end portions 91, which lesser diameter portion 98 is disposed eccentric with respect thereto. The eccentric portion 98 is disposed such that, when the lever arm 88 is rotated to its downwardmost position shown in dashed line in FIG. 2, by maximum downward deflection of the actuator 16, the eccentric 98 permits maximum air leakage around the spool and through orifice 47. When the lever 88 is in its maximum upward position shown in solid line in FIG. 2, the eccentric portion 98 of the spool is spaced most closely adjacent the air orifice 47 and provides maximum restriction of air flow from chamber 46a through orifice 47 to the control chamber 32. The feedback means 86 thus provides a continuous air bleed through air orifice 47, when the shuttle pad 63 is not seated against the air orifice and the air bleed is throttled by the eccentric spool 98 in accordance with the position of the actuator 16.

Referring now to FIG. 6, an alternate embodiment of the feedback aspect of invention is shown wherein the control block 100 has the air tower 102 disposed similarly as the air tower in FIG. 1, including a hollow cavity 104 vented through an aperture in the lower shell and communicating with an air orifice 106 for contact with a movable shuttle. The air tower 102 has an auxiliary vent port formed therein in the form of an elongated slot 108 formed in one face thereof and communicating the control chamber with air cavity 104. A rotary valve means in the form of a cam-edged plate 110 is pivotally mounted on the control block by shaft 112, which plate has feedback lever arm 114 attached thereto such that the plate rotates about shaft 112 as the feedback lever moves in response to actuator movement. The cam edge 111 of the plate is so shaped as to progressively uncover the slot 108 as the plate rotates with downward movement of the feedback lever, thus increasing air bleed to the control chamber independently of the flow through orifice 106.

DESIGN AND CALIBRATION

Figure 7:
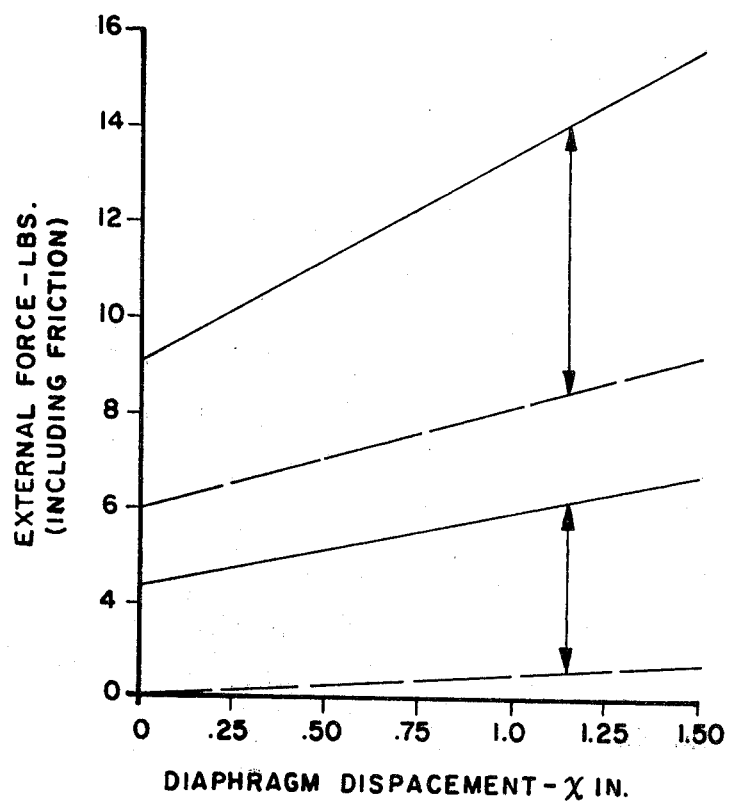
FIG. 7 is a graph of values of measured throttle force versus measured bottle displacement for a typical mass produced passenger vehicle.

In certain control systems applications, and particularly vehicle road speed regulators, the position output of the servo actuator is required to be nonlinear with respect to variations of the input control signal or, in other words, the servoactuator must behave as if the control system had a variable gain over its control range. For example, in vehicle cruise control systems, the amount of throttle movement required to produce a given change in vehicle speed increases as the speed of the vehicle increases. This is generally the result of increasing load requirements due to wind resistance, rolling resistance, vehicle drive train friction or grade encounter in the terrain over which the vehicle is traveling, and decreasing power available. In addition, the servoactuator must be a positioning device to compensate for, or absorb, vehicle throttle system hysteresis as mentioned hereinabove. Referring to FIG. 7, the variation in vehicle throttle linkage force versus linkage displacement, at the attachment point of the servo, is shown graphically for a typical passenger vehicle. The solid line plots in FIG. 7 indicate the maximum and minimum spring force experienced and the dashed-line plots indicate the hysteresis which is encountered for each solid line plot. From the example plotted in FIG. 7, it will be seen that, for a full throttle opening displacement of 1.0 inch (2.54 cm), a force hysteresis of 5 lbs. (2.30 Kg) may be experienced by the servo at the point of attachment to the throttle linkage. Therefore any force balance servo can not respond adequately to the erratic throttle forces which exist in the vehicle; and, as hereinbefore stated, a position-output servo is required.

In order to apply the servo design of the present invention to a vehicle, it is necessary that the approximate throttle plate angle which corresponds to throttle linkage displacement, at the point of proposed servo attachment, be known at various vehicle speeds for the conditions of constant vehicle speed (zero speed error) and for the conditions of running over level terrain. A typical set of measurements for a production passenger vehicle is plotted in FIG. 8.

Figure 9:
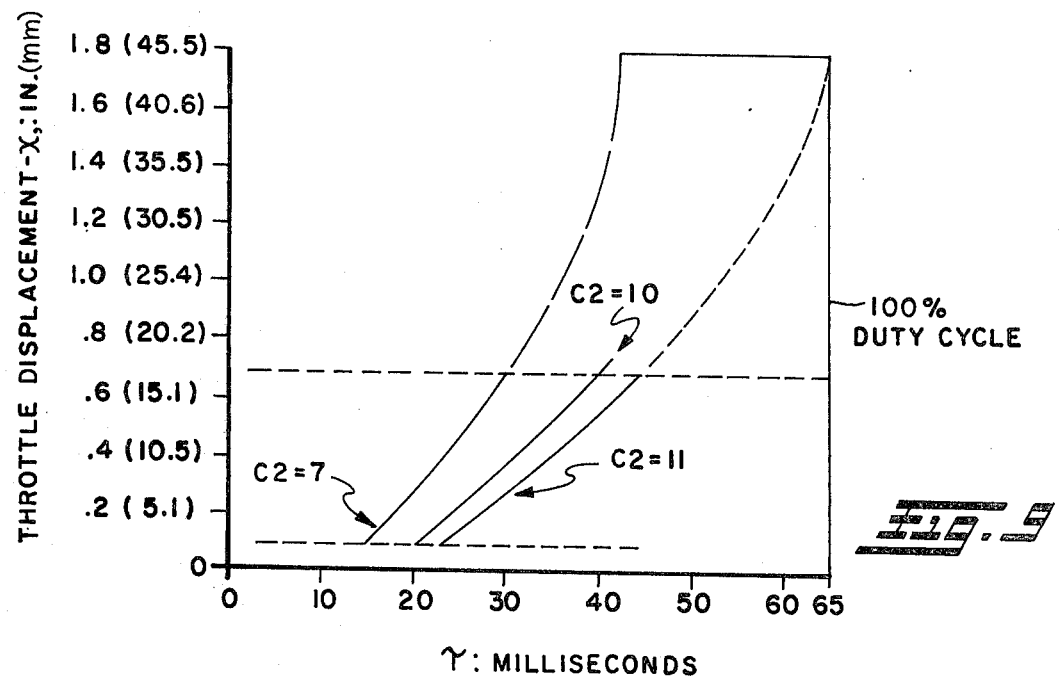
FIG. 9 is a graph of servoactuator displacement plotted as a function of control valve duty cycle dwell.

For servoactuators of the present electropneumatic type, in which a duty cycle control valve oscillates between pressure and vent orifice, the control of the actuator output is provided by varying the time in which the control valve flapper dwells in a position covering one orifice and eposing the other. The period of dwell has been found to be a convenient parameter for use in measuring the control function of the servoactuator. In particular, it has been found very useful to plot in graphical form the duty cycle period of the control valve flapper versus the actuator stroke and observe the shape of the curve for different conditions of pressure and vent orifice effective flow area for a given vacuum orifice effective flow area. For vent and fluid pressure orifice systems of equal effective flow restrictive area, the graph is a straight line and, where the fluid pressure orifice has effective restrictive flow area larger than the vent orifice, the graph curves parabolically upward with a slope which may be programmed by selection of the orifice sizes when no feedback means is employed. However, when the feedback means of the present invention is employed, the response curve of the servoactuator is substantially altered such that, in the regions of lower vehicle speed where only a moderate amount of throttle movement is required to maintain vehicle speed, the servoactuator yields a substantially linear response. At higher vehicle speeds, however, the feedback alters the response such that a slight change in the control signal duty cycle yields a substantially larger amount of throttle stroke in order to provide the required power to produce constant speed. With reference to FIG. 9, the preferred envelope of servoactuator response is shown for the vacuum operated servos in accordance with the present invention. In FIG. 9, throttle stroke or output actuator displacement X and millimeters is plotted as the ordinate and the duty cycle dwell in milliseconds is plotted as the abscissa.

FIG. 9 illustrates the preferred design envelope for the required response characteristics of a servoactuator for use as a vehicle speed regulator, for typical production passenger vehicle throttle linkage and spring systems.

It will be apparent, however, that the response of the servoactuator of either FIGS. 1-5 or the alternate embodiment of FIG. 6 may be varied by varying the amount of the feedback bleed through the air orifice and also by varying the ratio of the fluid pressure to vent orifice.

The following procedure may be used to determine the servoactuator parameters required to give the desired response. With reference to measured data for the vehicle, such as FIG. 7, an actuator diaphragm area is chosen to give sufficient output force to provide full throttle deflection for the particular throttle spring system at maximum control chamber signal pressure. Where an engine manifold vacuum is used as the source of control chamber pressure, the known effects of altitude must be considered in computing the maximum control signal pressure in the chamber. Having sized the actuator diaphragm to provide full throttle deflection, when called for, it is then necessary to determine the values of control pressure chamber signal pressure required to provide given values of throttle, or actuator displacement for the stiffest throttle spring conditions encountered, such as the upper plot in FIG. 7 using a given actuator return spring. The manner of performing the calculations for determining the values of chamber pressure will be apparent to those skilled in the art, and sample calculations are omitted for brevity. Generally, diaphragm having an area of 9–10 in$^2$ (58–64.5 cm$^2$) has been found particularly suitable for most passenger car throttle systems, and, a return spring 24 having a spring rate on the order of 1.0-1.5 lb./in (0.18-0.27 Kg/cm) has been found generally satisfactory for most passenger vehicle applications.

Figure 10:
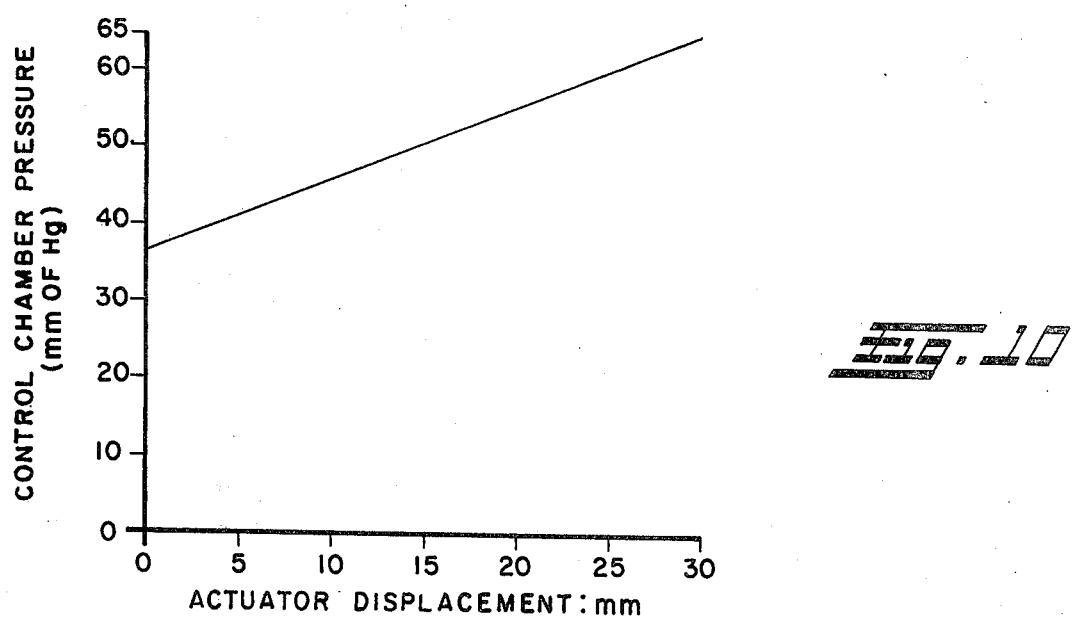
FIG. 10 is a graph of the preferred regime and shows control chamber pressure plotted as a function of throttle position for the upper and lower boundaries of the regime.

With reference to FIG. 10, the variation of control chamber pressure $\Delta P$ with respect to changes in actuator displacement is plotted graphically for the worst conditions of throttle spring forces as typically shown in the region between the uppermost and lowermost solid-line plot of FIG. 7. The graph of FIG. 10 is based upon chamber pressure measurements using a diaphragm having an area of 9 in.$^2$ (58 cm$^2$) and illustrates the servoactuator response required for a typical throttle linkage system having an initial preload of 3 lbs. (1.36 Kg) externally applied and 2 lbs. (0.91 Kg) internal preload from a return spring 24 having a spring rate of 1.0 lb./in. (0.18 Kg/cm).

Figure 8:
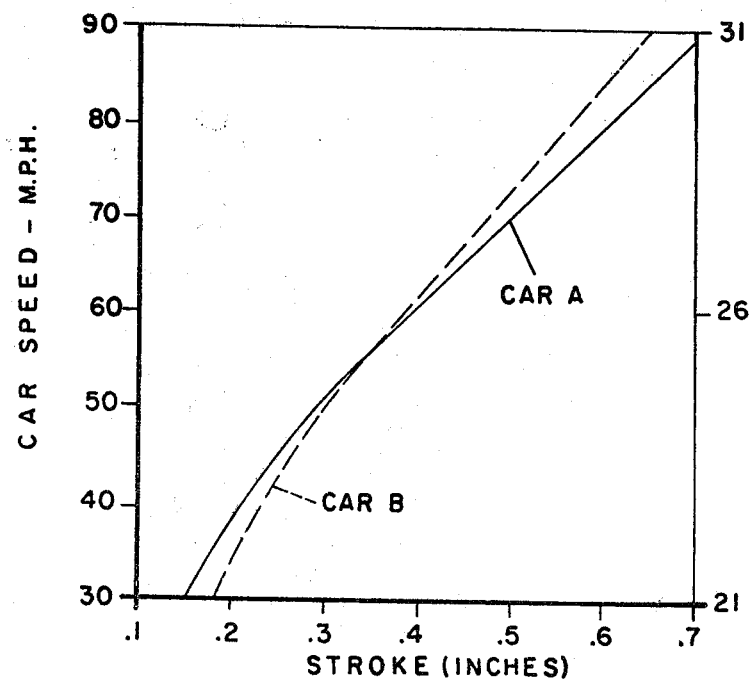
FIG. 8 is a graph of value of throttle displacement versus vehicle speed for constant speed over level terrain of a typical passenger automobile.

Using the information from FIGS. 8 and 10, the remaining parameters of effective restrictive orifice area and feedback system 86, may be determined by the following procedure to provide a servo having the desired satisfactory control response and within the envelope of FIG. 9.

Figure 11:
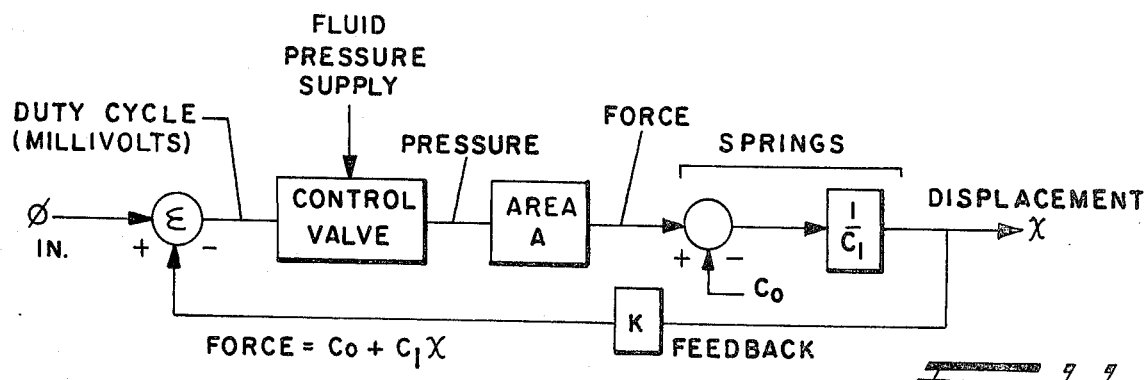
FIG. 11 is a logic diagram of the closed loop response of the present servoactuator.

Referring now to FIG. 11, a logic diagram for a control system, for a vehicle road speed regulator, is shown, which those skilled in the art of servomechanisms will recognize as a typical closed loop control system. From the logic of FIG. 11, expressions and procedures are developed which enable the parameters of feedback coefficient K, for design of feedback system 86, and sizing of vacuum orifice 45 and vent orifice 47.

In order to make a determination of the necessary vacuum orifice size, response criteria must be known about the rate of response for the system to be controlled. For example, for proper operation in vehicle speed regulators, it has been found satisfactory to have the actuator diaphragm move 63% of its full-throttle stroke in 1.0 seconds with feedback. For initial design purposes the vacuum and vent orifices 45, 47 are chosen equal and of a size which yields 63% of full diaphragm stroke in not more than 4.0 seconds without feedback. As a starting point in the determination of vacuum and vent orifice size, it has been found convenient to size both the vacuum orifice 45 and vent orifice 47 initially at 0.056 inches (1.86 mm) diameter for a maximum volume of control chamber 32 of about 27 in.$^3$ (440cm$^3$). When the vacuum and vent orifices 45, 47 have been sized to give the desired rate of response, then the feedback coefficient K may be determined and the corresponding parameters of the feedback system 86 determined to yield the required feedback action. From the logic of FIG. 11, the feedback coefficient K may be expressed as $$K = \frac{1}{A}\left[\frac{\phi_1 A - C_o}{X} - C_1\right]$$

where K has units of percent, $\phi$ is the control pressure for a change $\Delta T$ in duty cycle dwell of the input control signal, X is actuator displacement, Co is the total preload of the spring system in Kg, $C_1$ is the total effective spring rate for the vehicle throttle system including the actuator return spring 24 in units of Kg/cm, A is the area of the actuator diaphragm in cm$^2$ and X is the actuator displacement, in cm, for the change in control signal.

Figure 12:
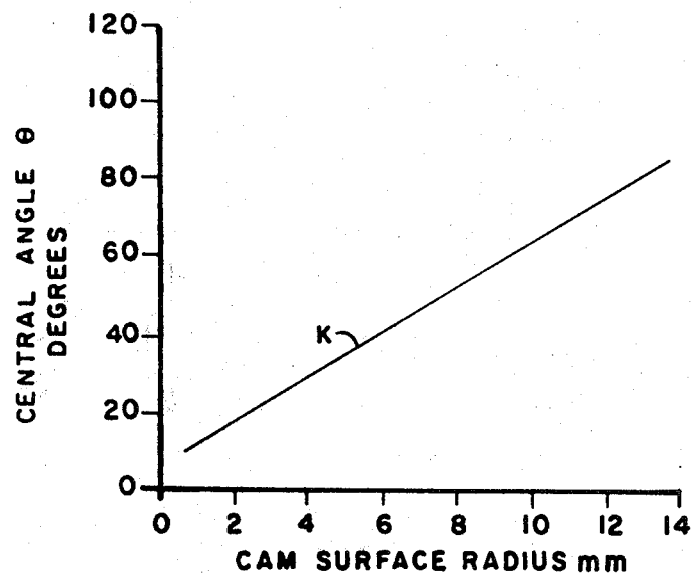
FIG. 12 is a graph of feedback cam surface radius plotted as a function of central angular position.

The control chamber pressure $\phi$ is determined by applying a control signal to the servo, with vacuum source applied to port 34 until the actuator 16 moves 0.40 inches (10.2 mm). While the control signal is held at this value, dead-weight force of 3.5 lb. (1.6 Kg) is applied, and the control signal altered to return the actuator 16 to the 0.40 inches (10.2 mm) displacement. The value of the control signal $\Delta T_1$ chamber pressure $\phi_1$, and displacement X = 0.40 inches (10.2 mm) along with the known constants Co and $C_1$ are then substituted in the above expression and the feedback coefficient K is computed. The coefficient K is the percentage that the control signal duty cycle dwell must be increased to give the desired control chamber pressure. The feedback coefficient also corresponds to the rate of change of flow in control pressure chamber, and, as such, may thus be used to design the configuration of the feedback cam. If the cylindrical eccentric cam surface 98 has the radius of its surface about the axis of spool 91 plotted graphically in Cartesian coordinates as a function of the central angular position O about the spool axis, the slope of the graph may be equated to the feedback coefficient K. Referring to FIG. 12, which has been satisfactory for use in designing the shape of cam surface 98 of FIG. 4 or cam surface 111 of FIG. 5, a graph of the feedback coefficient K is illustrated. In the embodiment of FIG. 4, the maximum amount of feedback occurs when there is a minimum clearance between cam surface 98 and the end face of orifice 47. The minimum feedback or bleed gap between cam 98 and orifice 47 must be chosen such that the control chamber vacuum will not be prevented from bleeding off within the appropriate time to provide adequate control response. In this regard, it has been found that, for a given maximum vacuum supply level, as, for example, 12 in Hg (30.5 cm Hg), the air flow through the bleed gap, for different values of actuator stroke, should preferably have values within a predetermined regime or envelope. In addition to the foregoing requirement of 63% full-throttle stroke in 1.0-2.0 seconds, the air bleed orifice, with maximum amount of restriction or throttling, must provide sufficient residual air flow to prevent full stroke movement of the actuator in the event of failure of the dump valve to open. In the preferred practice, the bleed flow should be sufficient to release the actuator 16 to 0.10 in. (0.25 cm) displacement in not more than 3 seconds in the event of dump valve failure.

Figure 13:
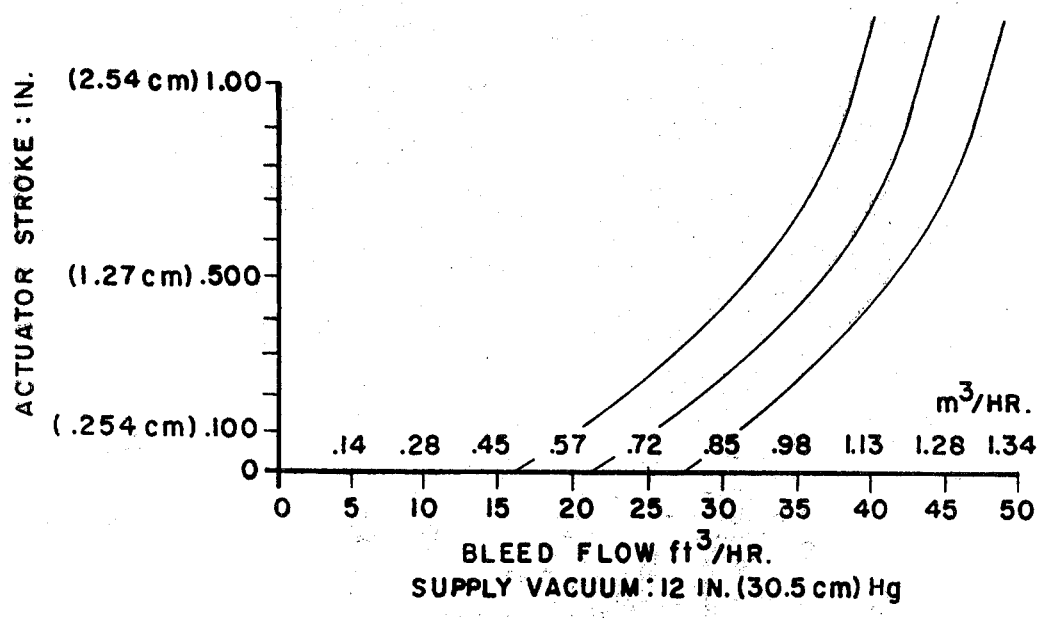
FIG. 13 is a graph of feedback bleed flow versus actuator stroke.

Referring to FIG. 13, the variation of bleed air flow through the air orifice 47 of the FIG. 4 embodiment, or the slot 108 of the FIG. 5 embodiment, as a function of the stroke of actuator 16, or the vertical stroke of follower 90, is shown graphically as a family of curves for different sizes of air orifice 47. The lowest curve of FIG. 13 represents bleed air flow for an air orifice of 0.048 in. (1.22 mm) diameter and the upper curve of FIG. 13 represents bleed flow variation for an air orifice of 0.060 in. (2.00 mm) diameter. From FIG. 13, it is seen that, in the present practice, for an actuator diaphragm constant effective area of 9 in.$^2$ (58.0 cm$^2$) control chamber volume of 27 in.$^3$ (440 cm$^3$) and for a vacuum supply of 12 in. (30.5 cm) Hg, a bleed flow of 15-25 ft$^3$/HR (0.42-0.72M.$^3$/HR) minimum and a bleed flow of 40-48 ft$^3$/HR (1.13-1.28 m$^3$/HR) maximum is preferred.

Having sized the vacuum orifice 47 and feedback means for the above-described minimum and maximum flow conditions, an initial feedback cam 98 or 111 is shaped in accordance with the coefficient K previously determined, as typically shown in FIG. 12. The servo, with the initial choice of feedback cam and orifices 45 and 47, is then operated and measurements of actuator displacement X taken for the various values of control signal duty cycle dwell from FIG. 8 corresponding to the desired road speeds at which the vehicle will be operated. The measured values of actuator displacement X are then plotted graphically as the ordinate with the corresponding vehicle speed as the abscissa. The resulting plot is then compared with the throttle response curve for the vehicle, FIG. 8. If the servo curve slope is too steep and curves upward too rapidly with increasing speed, the vacuum orifice is decreased slightly. If the curve is shifted from the vehicle curve, the air orifice size is increased or decreased slightly shift the servo curve. If the curve slope differs from the slope of the vehicle curve, the feedback coefficient is incrementally changed until the desired slope is obtained to match the vehicle curve. It will thus be understood by those skilled in the art that the process of matching the servo graph of actuator displacement X versus vehicle speed to graph of the measured value for the vehicle, such as FIG. 8, is an iterative procedure.

Although an eccentric cylindrical cam 98 has been shown in the embodiment of FIGS. 3 and 4, those skilled in the art will recognize that other feedback configurations such, as for example, a helix or a tapered needle-valve arrangement, may be employed. Similarly, it will be recognized that a tapered needle-valve arrangement may be substituted for the slot 108 and cam 111 of the FIG. 5 embodiment; and, any other suitable variable valve arrangement may be employed, which is capable of being designed to provide the flow variation in accordance with the feedback coefficient K as determined by the above-described procedure.

Figure 14:
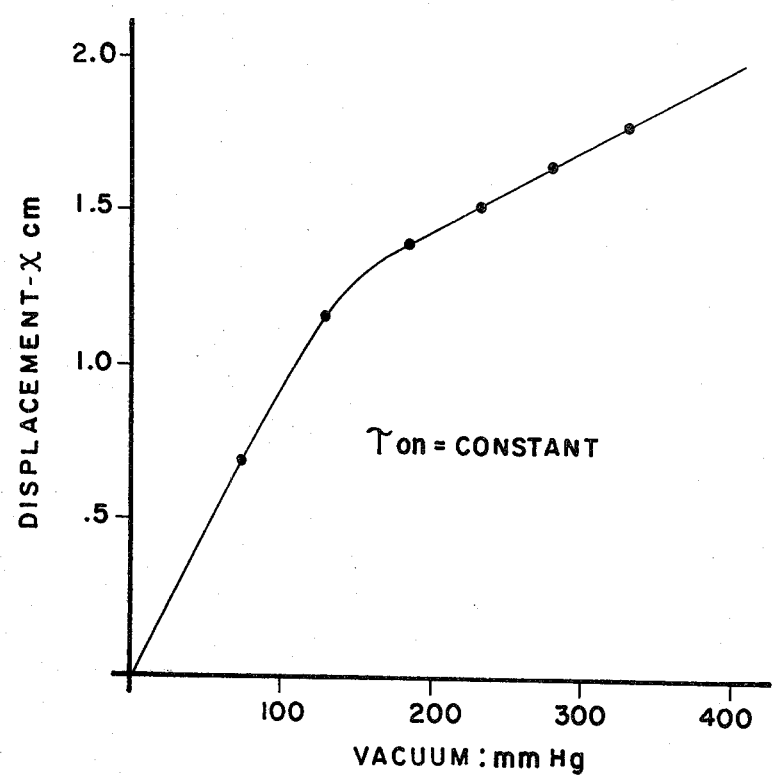
FIG. 14 is a graph of actuator stroke versus fluid source pressure.

The present servoactuator holds position well with wide variation in available source fluid pressure. However, vehicle acceleration under full throttle or RESUME is inherently limited when engine manifold vacuum falls below about 6 inches Hg. Referring to FIG. 14, it will be seen that at low source vacuum (minimum intake manifold depression) for level terrain cruise at 55 m.p.h. and Ton = a constant 33 ms, the servoactuator position output response is not prohibitively degraded until source vacuum differs from atmosphere by less than about 6 inches (150 mm) Hg. Typically at or near sea level, the range of source (manifold) vacuum, on level or gently rolling terrain, is the order of 8–14 in. Hg with a median of 12, whereas, at 7,500 ft. elevation above sea level the source vacuum level is 4–9 in. Hg with a median of 7 in. Hg. FIG. 14 thus shows the effectiveness of the feedback system in maintaining position output over a wide variation in source pressure and that the servoactuator is relatively insensitive to altitude variation.

Although the invention has been described herein in the preferred embodiment, it will be apparent to those having ordinary skill in the art that the invention is capable of modifications and variations and is limited only by the following claims.

We claim:

1. The method of controlling plural functions of an apparatus in response to an electrical input control signal comprising the steps of:
   (a) providing a housing defining a fluid pressure chamber and having port means venting same to the atmosphere, and pressure port means adapted for connection to a source of fluid pressure for communicating fluid pressure to said chamber;
   (b) moving a valve member alternately between a position closing said pressure port means and a position closing said vent port means for controlling fluid therethrough in response to said electrical input signal;
   (c) providing actuator means movable in response to the fluid pressure level in said chamber;
   (d) providing an auxiliary valve member movable with respect to said vent and pressure port means; and
   (e) sensing movement of said actuator means and moving said auxiliary valve member relative to said actuator means in response to said sensed movement for controlling the effective flow area of said vent port means.

2. A fluid pressure servoactuator responsive to a varying electrical input signal for providing a mechanical function output comprising:
   (a) housing means defining a fluid pressure chamber, said housing means including fluid pressure port means having a supply orifice adapted for connection to a source of fluid pressure and vent port means including an orifice venting said chamber to the atmosphere;
   (b) driver means responsive to said input signal and operable to produce a varying magnetomotive force;
   (c) control valve means movably responsive to said mmf and operable to alternately open and close said vent and pressure port means for controlling fluid pressure in said control chamber when said pressure port means is connected to a source of fluid pressure;
   (d) actuator means movable with respect to said housing means in response to the fluid pressure level in said chamber, said actuator means including means adapted for attachment thereto for performing said mechanical function; and,
   (e) feedback means including a movable valve member operable in response to movement of said actuator means to vary the effective flow area of at least one of said port means.

3. The servoactuator defined in claim 2, further comprising:
   (a) dump port means operative to provide auxiliary venting of said chamber to the atmosphere; and,
   (b) dump valve means including means operatively responsive to said mmf to move from a first position to a second position when said input signal exceeds a first predetermined level and responsive to said mmf to maintain said second position when said input signal is greater than a second predetermined level but substantially less than said first level, said movable means being operative in said first position to permit fluid flow through said dump port means and operative in said second position to prevent fluid flow through said dump port means.

4. The servoactuator defined in claim 2, wherein,
   (a) one of said port means includes means defining a flow control aperture; and,
   (b) said feedback means includes rotary valve means disposed adjacent said control aperture, said rotary valve means being responsive to movement of said actuator means to vary the effective flow area of said control aperture.

5. The servoactuator defined in claim 2, wherein, (a) one of said port means includes means defining an elongated aperture; and, (b) said feedback means includes rotary valve means having a plate means which covers and uncovers portions of said aperture partially blocking fluid flow therethrough in response to rotary movement of said plate means.

6. The servoactuator defined in claim 2, wherein, (a) one of said port means includes an aperture; and, (b) said rotary valve means includes a cam surface disposed adjacent said aperture in closely spaced relationship which rotates about an axis substantially parallel to the plane of said aperture for throttling flow through said aperture.

7. The servoactuator defined in claim 2, wherein said feedback means includes a member pivotably movable with respect to said housing means.

8. The servoactuator defined in claim 2, wherein said movable member includes a cam surface movable with respect to said port means.

9. A servoactuator responsive to a varying electrical input control signal and operative, when connected to a source of fluid pressure, to provide a mechanical function output in response to said input signal, said servoactuator comprising:

(a) housing means defining a fluid pressure control chamber, said housing means including vent means providing fluid porting of said chamber to the atmosphere and pressure port means adapted for connection to said source of fluid pressure for permitting fluid communication between said source and said chamber;

(b) a coil of electrically conductive material operative to produce a magnetomotive force (mmf) responsive to said input signal;

(c) control valve means associated with said coil and having a first armature means movably responsive to said mmf when said input signal equals and exceeds a first predetermined level for controlling fluid flow through at least one of said vent and pressure port means, thereby controlling the pressure level in said chamber;

(d) actuator means movable in response to changes in the pressure level in said chamber, said actuator means including attachment means adapted for connection thereto for performing said output function;

(e) said housing means including dump port means providing auxiliary fluid porting of said chamber to the atmosphere; and, (f) dump valve means associated with said coil and having a second armature disposed to move independently of and in magnetic series circuit with said first armature means and movable between a first state permitting fluid flow through said dump port means and a second state blocking fluid flow through said dump port means, said dump valve means being operative to move to said second state in response to said mmf when said input signal is at and greater than a second predetermined level, said dump valve means being operative to only hold said second state in response to said mmf when said input signal is at or greater than a third predetermined level, and said control valve means is nonresponsive to said mmf when said input signal is at and less than said third predetermined level, wherein said second input signal level is substantially less than said first level and said third level is less than said second level.

10. The device defined in claim 9, wherein said dump valve means includes means biasing said dump valve means to said first state.

11. The device defined in claim 9, wherein said control valve means, said dump valve means and said coil are disposed in magnetic series circuit arrangement.

12. The servoactuator defined in claim 9, further comprising:

(a) throttling means including means movable with respect to at least one of said fluid pressure port and operable to vary the flow area thereof; and, (b) feedback means responsive to movement of said actuator and operable in response thereto for controlling said throttling means.

13. A servoactuator providing a mechanical output in response to a varying electrical input control signal upon connection to a source of fluid pressure, said servoactuator comprising:

(a) housing means defining a fluid pressure chamber, said housing means including fluid pressure port means adapted for connection to a source of fluid pressure and vent means porting said chamber to the atmosphere;

(b) electromagnetic means operative to produce a magnetomotive force (mmf) in response to said control signal, said electromagnetic means including (i) control valve means including a first member movably responsive to certain levels of said mmf and operable in response thereto to control fluid flow through said pressure port means and said vent means when said pressure port means is connected to a source of fluid pressure; and (ii) dump valve means, including auxiliary port means, normally venting said chamber to the atmosphere and including a second movable member operable in response to said mmf to close said auxiliary port means, wherein said first movable member and said second movable member are disposed to move independently in magnetic series loop arrangement with the flux lines of said electromagnetic means and said second member is movably responsive to said mmf only when said control signal exceeds a first predetermined level and said first movable member is responsive to said mmf only when said control signal exceeds a second predetermined level substantially greater than said first level; and (c) actuator means movable with respect to said housing means in response to changes in the pressure level in said chamber.

14. A fluid pressure servoactuator responsive to a varying electrical input signal for providing a mechanical function output comprising:

(a) housing means defining a fluid pressure chamber, said housing means including fluid pressure port means adapted for connection to a source of fluid pressure and vent port means venting said chamber to the atmosphere;

(b) driver means responsive to said input signal and operable to produce a varying magnetomotive force (mmf);

(c) control valve means responsive to said mmf and operative upon connection of said pressure port means to a source of fluid pressure to alternately open and close said pressure and vent port means for controlling fluid pressure in said chamber;

(d) actuator means movable with respect to said housing means in response to the fluid pressure level in said chamber for performing said mechanical function; and (e) feedback means sensing movement of said actuator means and operable in response to said sensed movement to vary the flow area of at least one of said port means.

* * * * *